United States Patent
Sato et al.

(10) Patent No.: US 10,033,037 B2
(45) Date of Patent: Jul. 24, 2018

(54) LITHIUM ION SECONDARY BATTERY INCLUDING A COMPOSITION CONTAINING LITHIUM AND BORON

(71) Applicant: TDK CORPORATION, Tokyo (JP)

(72) Inventors: Hiroshi Sato, Tokyo (JP); Atsushi Sano, Tokyo (JP)

(73) Assignee: TDK CORPORATION, Tokyo (JP)

(*) Notice: Subject to any disclaimer, the term of this patent is extended or adjusted under 35 U.S.C. 154(b) by 356 days.

(21) Appl. No.: 14/707,566

(22) Filed: May 8, 2015

(65) Prior Publication Data

US 2015/0333365 A1    Nov. 19, 2015

(30) Foreign Application Priority Data

May 19, 2014  (JP) .................................. 2014-103037
Apr. 15, 2015  (JP) .................................. 2015-083427

(51) Int. Cl.
*H01M 10/0525* (2010.01)
*H01M 4/485* (2010.01)
(Continued)

(52) U.S. Cl.
CPC ............ *H01M 4/485* (2013.01); *H01M 4/13* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS

| | | |
|---|---|---|
| 2007/0202414 A1 | 8/2007 | Yoshida et al. |
| 2009/0123846 A1 | 5/2009 | Okada et al. |
| | (Continued) | |

FOREIGN PATENT DOCUMENTS

| | | |
|---|---|---|
| FR | 2956523 A1 | 8/2011 |
| JP | H05-193248 A | 8/1993 |
| | (Continued) | |

OTHER PUBLICATIONS

Oct. 7, 2016 Office Action Issued in U.S. Appl. No. 14/707,722.
(Continued)

*Primary Examiner* — Alex Usyatinsky
(74) *Attorney, Agent, or Firm* — Oliff PLC

(57) ABSTRACT

Provided is an all-solid lithium ion secondary battery including a sintered body including a solid electrolyte layer and a positive electrode layer and a negative electrode layer which are stacked alternately with the solid electrolyte layer interposed therebetween, wherein: the positive electrode layer, the negative electrode layer, and the solid electrolyte layer include a compound containing lithium and boron; and a content of lithium and boron contained in the compound to a total of a positive electrode active material included in the positive electrode layer, a negative electrode active material included in the negative electrode layer, and a solid electrolyte included in the solid electrolyte layer is respectively 4.38 mol % to 13.34 mol % in terms of $Li_2CO_3$ and 0.37 mol % to 1.11 mol % in terms of $H_3BO_3$.

5 Claims, 1 Drawing Sheet

(51) Int. Cl.
 *H01M 4/58*  (2010.01)
 *H01M 4/13*  (2010.01)
 *H01M 4/505*  (2010.01)
 *H01M 4/525*  (2010.01)
 *H01M 4/62*  (2006.01)
 *H01M 10/0562*  (2010.01)

(52) U.S. Cl.
 CPC .......... *H01M 4/5825* (2013.01); *H01M 4/62* (2013.01); *H01M 10/0525* (2013.01); *H01M 10/0562* (2013.01); *H01M 2220/30* (2013.01); *H01M 2300/0068* (2013.01); *H01M 2300/0071* (2013.01)

(56) References Cited

U.S. PATENT DOCUMENTS

| | | |
|---|---|---|
| 2009/0123847 A1 | 5/2009 | Okada et al. |
| 2009/0202912 A1* | 8/2009 | Baba ..................... H01M 4/666 |
| | | 429/231.95 |
| 2010/0216032 A1* | 8/2010 | Baba ..................... H01M 4/366 |
| | | 429/322 |
| 2011/0003212 A1* | 1/2011 | Sato ................... H01M 10/0585 |
| | | 429/322 |
| 2011/0081580 A1 | 4/2011 | Stadler et al. |
| 2012/0015234 A1* | 1/2012 | Iwaya ................... H01M 4/131 |
| | | 429/152 |
| 2012/0021298 A1* | 1/2012 | Maeda .................. H01M 4/131 |
| | | 429/304 |
| 2013/0017435 A1* | 1/2013 | Sato ....................... H01M 4/505 |
| | | 429/158 |
| 2013/0018956 A1* | 1/2013 | McConnell .......... G06Q 10/109 |
| | | 709/204 |
| 2013/0189562 A1 | 7/2013 | Dolle et al. |
| 2014/0099541 A1* | 4/2014 | Hayashi .............. H01M 4/5825 |
| | | 429/211 |

FOREIGN PATENT DOCUMENTS

| | | |
|---|---|---|
| JP | H07-135790 A | 5/1995 |
| JP | 4745323 B2 | 8/2011 |
| JP | 4797105 B2 | 10/2011 |
| JP | 5193248 B2 | 5/2013 |
| WO | 07/135790 A1 | 11/2007 |
| WO | 2010067818 A1 | 6/2010 |
| WO | WO 2012/157774 * | 11/2012 |

OTHER PUBLICATIONS

Feb. 29, 2016 Office Action issued in U.S. Appl. No. 14/707,934.
Feb. 29, 2016 Office Action issued in U.S. Appl. No. 14/707,361.
Aug. 10, 2017 Office Action issued in U.S. Appl. No. 14/707,722.

* cited by examiner

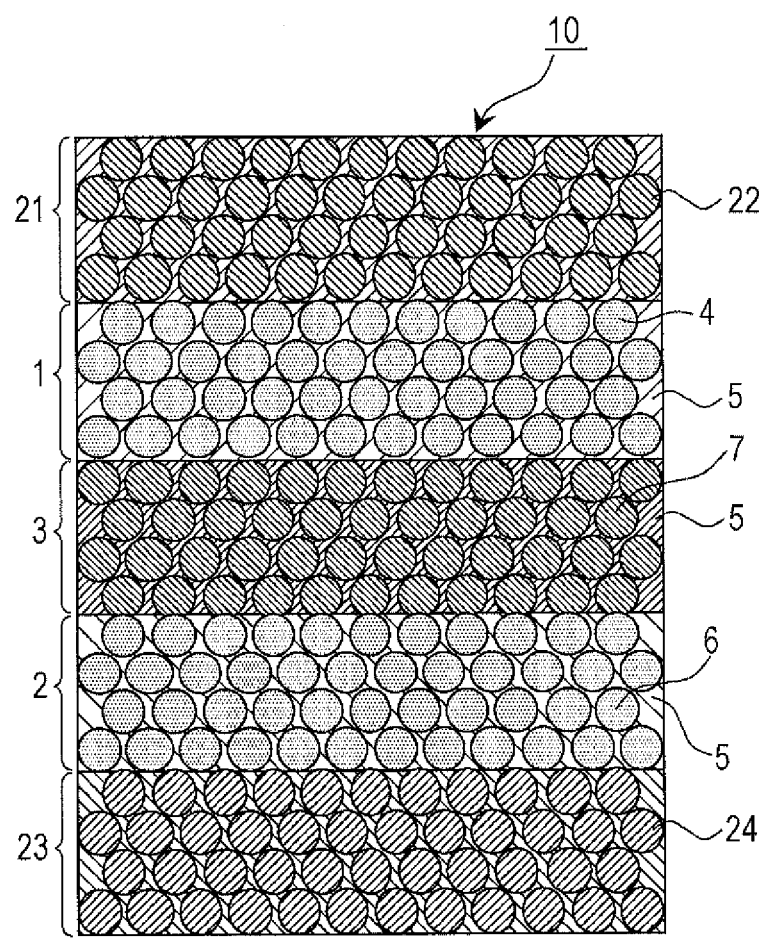

LITHIUM ION SECONDARY BATTERY INCLUDING A COMPOSITION CONTAINING LITHIUM AND BORON

CROSS-REFERENCE TO RELATED APPLICATION

This application claims priority from Japanese Patent Application No. 2014-103037 filed on May 19, 2014 and Japanese Patent Application No. 2015-083427 filed on Apr. 15, 2015 with the Japan Patent Office, the entire content of which is hereby incorporated by reference.

BACKGROUND

1. Technical Field

The present disclosure relates to a lithium ion secondary battery.

2. Related Art

Electronics techniques have made remarkable advances in recent years. Portable electronic appliances have achieved reduction in size, weight, and thickness and increase in functionality. Along with this, the battery used as a power source of the electronic appliance has been strongly desired to have smaller size, weight, and thickness and higher reliability. In view of this, an all-solid lithium ion secondary battery including a solid electrolyte layer having a solid electrolyte has attracted attention.

In general, all-solid lithium ion secondary batteries are classified into two types of a thin-film type and a bulk type. The thin-film type is manufactured by a thin-film technique such as a PVD method or a sol-gel method. The bulk type is manufactured by powder compacting of an electrode active material or a sulfide-based solid electrolyte with low grain-boundary resistance. As for the thin-film type, it is difficult to increase the thickness of the active material layer and to increase the number of layers. This results in problems that the battery capacity is low and the manufacturing cost is high. On the other hand, the bulk type employs the sulfide-based solid electrolyte. In view of this, it is necessary to manufacture the battery in a glove box with a managed dew point. Moreover, it is difficult to make the solid electrolyte into sheet. Thus, decreasing the thickness of the solid electrolyte layer and increasing the number of layers of the battery have been an issue.

In view of the problem as above, Japanese Domestic Re-publication of PCT International Publication No. 07-135790 describes the all-solid battery manufactured by the industrially applicable manufacturing method that enables the mass production. In this manufacturing method, the oxide-based solid electrolyte, which is stable in the air, is used and the members made into sheets are stacked and then fired at the same time.

According to Japanese Patent No. 04745323, an object of the bulk type all-solid lithium ion secondary battery is to prevent the delamination (interlayer separation) and non-lamination (defect of non-attachment) caused by the difference in contraction ratio of the members and to reduce the manufacturing cost by reducing the firing temperature. In the disclosed example, the above object is achieved by adding a boron compound as the sintering aid. In the conventional method, however, problems remain that the lithium ion secondary battery has the high internal resistance and this results in the lower capacity.

In recent years, Japanese Patent No. 05193248 has disclosed the manufacture of the bulk type all-solid lithium ion secondary battery by the method in which the members are made into sheets and stacked and then fired at the same time. However, further reduction of the internal resistance and improvement of the capacity have been required.

SUMMARY

A lithium ion secondary battery according to an embodiment of the present disclosure is an all-solid lithium ion secondary battery including a sintered body including a solid electrolyte layer, and a positive electrode layer and a negative electrode layer alternately stacked with the solid electrolyte layer interposed therebetween. The positive electrode layer, the negative electrode layer, and the solid electrolyte layer include a compound containing lithium and boron. A content of lithium and boron contained in the compound to a total of a positive electrode active material included in the positive electrode layer, a negative electrode active material included in the negative electrode layer, and a solid electrolyte included in the solid electrolyte layer is respectively 4.38 mol % to 13.34 mol % in terms of $Li_2CO_3$ and 0.37 mol % to 1.11 mol % in terms of $H_3BO_3$.

BRIEF DESCRIPTION OF DRAWINGS

FIG. 1 is a sectional view illustrating a conceptual structure of a lithium ion secondary battery.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A lithium ion secondary battery according to an embodiment of the present disclosure has been made in view of the above conventional problem. An object of the present disclosure is to provide a lithium ion secondary battery having low internal resistance and high capacity.

In order to solve the above described problem, a lithium ion secondary battery according to an embodiment of the present disclosure includes a sintered body having a solid electrolyte layer, and a positive electrode layer and a negative electrode layer which are stacked alternately with the solid electrolyte layer interposed therebetween, the lithium ion secondary battery being an all-solid type. The positive electrode layer, the negative electrode layer, and the solid electrolyte layer include a compound containing lithium and boron. A content of lithium and boron contained in the compound to a total of a positive electrode active material included in the positive electrode layer, a negative electrode active material included in the negative electrode layer, and a solid electrolyte included in the solid electrolyte layer is respectively 4.38 mol % to 13.34 mol % in terms of $Li_2CO_3$ and 0.37 mol % to 1.11 mol % in terms of $H_3BO_3$.

In the lithium ion secondary battery with the above structure, the added compound containing lithium and boron improves the contact area at the interface between the positive electrode active material and the positive electrode active material, the interface between the positive electrode active material and the solid electrolyte, the interface between the solid electrolyte and the solid electrolyte, the interface between the solid electrolyte and the negative electrode active material, and the interface between the negative electrode active material and the negative electrode active material. Furthermore, the added compound has high lithium ion conductivity. Therefore, the internal resistance of the lithium ion secondary battery is reduced and the battery capacity thereof is improved.

In the lithium ion secondary battery according to the embodiment of the present disclosure, the compound containing lithium and boron may exist at the grain boundary of the positive electrode active material, the grain boundary of the negative electrode active material, and the grain boundary of the solid electrolyte.

In the lithium ion secondary battery with the above structure, the added compound containing lithium and boron improves the contact area at the interface between the positive electrode active material and the positive electrode active material, the interface between the positive electrode active material and the solid electrolyte, the interface between the solid electrolyte and the solid electrolyte, the interface between the solid electrolyte and the negative electrode active material, and the interface between the negative electrode active material and the negative electrode active material. Furthermore, the added compound has high lithium ion conductivity. Therefore, the internal resistance of the lithium ion secondary battery is further reduced and the capacity thereof is more improved.

In the lithium ion secondary battery according to the embodiment of the present disclosure, moreover, the compound containing lithium and boron may be amorphous.

In the lithium ion secondary battery structured as above, the elements are arranged in disorder within the compound containing lithium and boron. Such a compound does not have anisotropy of crystal. Therefore, the resistance due to the anisotropic constituent that might reduce the ion conductivity is low. For this reason, the internal resistance of the lithium ion secondary battery is reduced further and the capacity thereof is improved further.

In the lithium ion secondary battery according to the embodiment of the present disclosure, the solid electrolyte may be at least one selected from a group consisting of $Li_{3+x1}Si_{x1}P_{1-x1}O_4$ ($0.4 \leq x1 \leq 0.6$), $Li_{1+x2}Al_{x2}Ti_{2-x2}(PO_4)_3$ ($0 \leq x2 \leq 0.6$), germanium lithium phosphate ($LiGe_2(PO_4)_3$), $Li_2O$—$V_2O_5$—$SiO_2$, and $Li_2O$—$P_2O_5$—$B_2O_3$.

In the lithium ion secondary battery structured as above, the added compound containing lithium and boron exists at the interface between the solid electrolyte and the solid electrolyte, the interface between the positive electrode active material and the solid electrolyte, and the interface between the negative electrode active material and the solid electrolyte. This added compound has ion conductivity. For this reason, the internal resistance of the lithium ion secondary battery is reduced further and the capacity thereof is improved further.

In the lithium ion secondary battery according to the embodiment of the present disclosure, the positive electrode active material and the negative electrode active material may be at least one selected from a group consisting of lithium manganese composite oxide $Li_2Mn_{x3}Ma_{1-x3}O_3$ ($0.8 \leq x3 \leq 1$, Ma=Co, Ni), lithium cobaltate ($LiCoO_2$), lithium nickelate ($LiNiO_2$), lithium manganese spinel ($LiMn_2O_4$), composite metal oxides represented by general formula: $LiNi_{x4}Co_{y4}Mn_{z4}O_2$ ($x4+y4+z4=1$, $0 \leq x4 \leq 1$, $0 \leq y4 \leq 1$, $0 \leq z4 \leq 1$), a lithium vanadium compound ($LiV_2O_5$), olivine $LiMbPO_4$ (wherein Mb represents one or more elements selected from Co, Ni, Mn, Fe, Mg, Nb, Ti, Al, and Zr, or VO), vanadium lithium phosphate ($Li_3V_2(PO_4)_3$ or $LiVOPO_4$), Li-excess solid solution positive electrode $Li_2MnO_3$—$LiMcO_2$ (Mc=Mn, Co, Ni), lithium titanate ($Li_4Ti_5O_{12}$), and composite metal oxides represented by $Li_aNi_{x5}Co_{y5}Al_{z5}O_2$ ($0.9<a<1.3$, $0.9<x5+y5+z5<1.1$).

In the lithium ion secondary battery structured as above, the added compound containing lithium and boron exists at the interface between the positive electrode active material and the positive electrode active material, the interface between the positive electrode active material and the solid electrolyte, the interface between the negative electrode active material and the negative electrode active material, and the interface between the negative electrode active material and the solid electrolyte. This added compound has ion conductivity. For this reason, the internal resistance of the lithium ion secondary battery is reduced further and the capacity thereof is improved further.

In the lithium ion secondary battery according to the embodiment of the present disclosure, the solid electrolyte is lithium phosphosilicate ($Li_{3+x1}Si_{x1}P_{1-x1}O_4$ ($0.4 \leq x1 \leq 0.6$)), The positive electrode active material and the negative electrode active material may be $Li_2Mn_{x3}M_{1-x3}O_3$ ($0.8 \leq x3 \leq 1$, M=Co, Ni).

In the lithium ion secondary battery with the above structure, the added compound containing lithium and boron improves the contact area at the interface between the positive electrode active material particles, the interface between the positive electrode active material and the solid electrolyte, the interface between the solid electrolyte particles, the interface between the solid electrolyte and the negative electrode active material, and the interface between the negative electrode active material particles. Furthermore, the added compound has high lithium ion conductivity. Therefore, the internal resistance of the lithium ion secondary battery is reduced and the battery capacity thereof is improved.

According to the embodiment of the present disclosure, the lithium ion secondary battery with low internal resistance and high capacity can be provided.

An embodiment of the present disclosure is hereinafter described with reference to the drawings. Note that the lithium ion secondary battery of the present disclosure is not limited to the embodiment below. The component described below includes another component that is easily conceived by a person skilled in the art and the component that is substantially the same as the described component. The components in the description below can be used in combination as appropriate.

<Lithium Ion Secondary Battery>

A lithium ion secondary battery according to an embodiment of the present disclosure is an all-solid lithium ion secondary battery including a sintered body including a positive electrode layer and a negative electrode layer. The positive electrode layer and the negative electrode layer of this lithium ion secondary battery are alternately stacked with a solid electrolyte layer interposed therebetween. Here, the positive electrode layer, the negative electrode layer, and the solid electrolyte layer include a compound containing lithium and boron.

(Structure of Lithium Ion Secondary Battery)

FIG. 1 is a sectional view illustrating a conceptual structure of a lithium ion secondary battery 10 according to an example of this embodiment. In the lithium ion secondary battery 10 illustrated in FIG. 1, a positive electrode layer 1 and a negative electrode layer 2 are stacked with a solid electrolyte layer 3 interposed therebetween. The positive electrode layer 1 includes a positive electrode active material 4 and a compound 5 containing lithium and boron. The negative electrode layer 2 includes a negative electrode active material 6 and the compound 5 containing lithium and boron. The solid electrolyte layer 3 includes a solid electrolyte 7 and the compound 5 containing lithium and boron. A positive electrode current collector layer 21 includes a positive electrode current collector 22. A negative electrode current collector layer 23 includes a negative electrode current collector 24.

The compound 5 containing lithium and boron added to the positive electrode layer 1, the negative electrode layer 2, and the solid electrolyte layer 3 before firing functions as a sintering aid in firing. In other words, as the temperature is increased, the compound 5 melts before the positive electrode active material 4, the negative electrode active material 6, and the solid electrolyte 7. This results in the generation of a liquid phase of the compound 5 containing lithium and boron. This liquid phase causes the ceramic particles to be attracted to each other and segregated at the grain boundary. Therefore, the contact area at the interface between the positive electrode active material 4 and the positive electrode active material 4 in the positive electrode layer 1, the interface between the positive electrode active material 4 and the solid electrolyte 7 constituting the interface between the positive electrode layer 1 and the solid electrolyte layer 3, the interface between the solid electrolyte 7 and the solid electrolyte 7 in the solid electrolyte layer 3, the interface between the solid electrolyte 7 and the negative electrode active material 6 constituting the interface between the solid electrolyte layer 3 and the negative electrode layer 2, and the interface between the negative electrode active material 6 and the negative electrode active material 6 in the negative electrode layer 2 is increased.

The compound 5 containing lithium and boron segregated at the grain boundary has lithium ion conductivity. Thus, the internal resistance of the lithium ion secondary battery 10 is reduced and the capacity thereof is improved.

On this occasion, the compound 5 containing lithium and boron segregated at the grain boundary may be amorphous. In the amorphous phase, the elements are arranged in disorder. The amorphous phase does not have anisotropy of crystal. Therefore, in the lithium ion secondary battery 10, the resistance due to the anisotropic constituent that might reduce the ion conductivity is low. For this reason, the internal resistance of the lithium ion secondary battery 10 is reduced further and the capacity thereof is improved further.

Whether the compound 5 containing lithium and boron segregated at the grain boundary is amorphous or not can be determined by the X-ray diffraction measurement. Specifically, if the compound 5 is amorphous, the X-ray diffraction peak is not observed because the compound is not crystalline. If the compound 5 is crystalline, the X-ray diffraction peak is observed.

FIG. 1 is a sectional view of the lithium ion secondary battery 10 including one battery cell including a stacked body. The lithium ion secondary battery 10 of this embodiment, however, is not limited to the lithium ion secondary battery 10 including one battery cell including the stacked body illustrated in FIG. 1. The battery cell including a stacked body including any number of layers provided with a current collector layer is also included in the lithium ion secondary battery 10 of this embodiment. A part of the lithium ion secondary battery 10 can be largely changed in accordance with the specification of the capacity and current required for the lithium ion secondary battery 10.

(Solid Electrolyte)

As the solid electrolyte 7 included in the solid electrolyte layer 3 of the lithium ion secondary battery 10 of this embodiment, the material with low electron conductivity and high lithium ion conductivity can be used. For example, at least one selected from the group consisting of $Li_{3+x1}Si_{x1}P_{1-x1}O_4$ (0.4≤x1≤0.6), $Li_{1+x2}Al_{x2}Ti_{2-x2}(PO_4)_3$ (0≤x2≤0.6), germanium lithium phosphate ($LiGe_2(PO_4)_3$), $Li_2O-V_2O_5-SiO_2$, and $Li_2O-P_2O_5-B_2O_3$ can be used. In particular, titanium aluminum lithium phosphate typified by $Li_{1-x}Al_xTi_{2-x}(PO_4)_3$ (0≤x≤0.6), and moreover $Li_{1+x}Al_xTi_{2-x}(PO_4)_3$ (0≤x≤0.6) can be used.

(Positive Electrode Active Material and Negative Electrode Active Material)

As the positive electrode active material 4 included in the positive electrode layer 1 and the negative electrode active material 6 included in the negative electrode layer 2 in the lithium ion secondary battery 10 of this embodiment, the material capable of efficient intercalation and deintercalation of lithium ions can be used. For example, a transition metal oxide or a transition metal composite oxide may be used. Specifically, at least one of lithium manganese composite oxide $Li_2Mn_{x3}Ma_{1-x3}O_3$ (0.8≤x3≤1, Ma=Co, Ni), lithium cobaltate ($LiCoO_2$), lithium nickelate ($LiNiO_2$), lithium manganese spinel ($LiMn_2O_4$), composite metal oxides represented by general formula: $LiNi_{x4}Co_{y4}Mn_{z4}O_2$ (x4+y4+z4=1, 0≤x4≤1, 0≤y4≤1, 0≤z4≤1), a lithium vanadium compound ($LiV_2O_5$), olivine $LiMbPO_4$ (wherein Mb represents one or more elements selected from Co, Ni, Mn, Fe, Mg, Nb, Ti, Al, and Zr), vanadium lithium phosphate ($Li_3V_2(PO_4)_3$ or $LiVOPO_4$), Li-excess solid solution positive electrode $Li_2MnO_3-LiMcO_2$ (Mc=Mn, Co, Ni), lithium titanate ($Li_4Ti_5O_{12}$), and composite metal oxides represented by $Li_aNi_{x5}Co_{y5}Al_{z5}O_2$ (0.9<a<1.3, 0.9<x5+y5+z5<1.1) may be used.

Among the above transition metal oxides and transition metal composite oxides, in particular, vanadium lithium phosphate can be used. As the vanadium lithium phosphate, at least one of $LiVOPO_4$ and $Li_3V_2(PO_4)_3$ can be used. $LiVOPO_4$ and $Li_3V_2(PO_4)_3$ may be lithium-deficient. In particular, $Li_xVOPO_4$ (0.94≤x≤0.98) and $Li_xV_2(PO_4)_3$ (2.8≤x≤2.95) can be used.

The material of the positive electrode layer 1 and the material of the negative electrode layer 2 may be exactly the same. When the above non-polar lithium ion secondary battery is attached to the circuit board, it is not necessary to designate the orientation of the attachment. This leads to the advantage that the mounting speed of the lithium ion secondary battery is improved drastically.

Here, the active materials included in the positive electrode layer 1 and the negative electrode layer 2 are not clearly distinguished. Out of the two kinds of compounds, the potentials of the compounds are compared and the compound with nobler potential is used as the positive electrode active material 4 and the compound with baser potential is used as the negative electrode active material 6.

(Positive Electrode Current Collector and Negative Electrode Current Collector)

The positive electrode current collector 22 included in the positive electrode current collector layer 21 and the negative electrode current collector 24 included in the negative electrode current collector layer 23 of the lithium ion secondary battery 10 of this embodiment can be formed of the material with high electric conductivity. For example, silver, palladium, gold, platinum, aluminum, copper, and nickel can be used. In particular, copper uneasily reacts with $Li_{1+x2}Al_{x2}Ti_{2-x2}(PO_4)_3$ (0≤x2≤0.6) of the solid electrolyte 7 and moreover, copper is effective in reducing the internal resistance of the lithium ion secondary battery 10; therefore, copper can be suitably used. The material of the positive electrode current collector 22 may be either the same or different from the material of the negative electrode current collector 24.

The positive electrode current collector layer 21 and the negative electrode current collector layer 23 of the lithium ion secondary battery 10 of this embodiment may include the positive electrode active material 4 and the negative electrode active material 6, respectively.

The adhesion between the positive electrode current collector layer 21 and the positive electrode layer 1 and the adhesion between the negative electrode current collector layer 23 and the negative electrode layer 2 are improved when the positive electrode current collector layer 21 includes the positive electrode active material 4 and the negative electrode current collector layer 23 includes the negative electrode active material 6.

The content ratio of the positive electrode active material 4 and the negative electrode active material 6 in this case is not particularly limited unless the function of the current collector is deteriorated. The volume ratio of the positive electrode current collector 21 to the positive electrode active material 4 and the volume ratio of the negative electrode current collector 23 to the negative electrode active material 6 may be in the range of 90/10 to 70/30.

(Compound Containing Lithium and Boron)

The compound 5 containing lithium and boron added to the lithium ion secondary battery 10 of this embodiment may constitute the compound containing lithium and boron after firing. Therefore, the compound containing lithium and boron may be added before firing. Alternatively, a lithium compound and a boron compound that form the compound containing lithium and boron may be used in firing. In particular, $Li_2CO_3$ can be used as the lithium compound and $H_3BO_3$ can be used as the boron compound. The compound properties of these materials are not easily changed by water or carbon dioxide. Therefore, these materials can be weighed in the air. Thus, lithium and boron can be added simply, accurately and suitably.

A content of lithium in the compound 5 containing lithium and boron, to the total of the positive electrode active material 4, the negative electrode active material 6, and the solid electrolyte 7 is preferably 4.38 mol % to 13.34 mol % in terms of $Li_2CO_3$. Here, a content of boron in the compound 5 is preferably 0.37 mol % to 1.11 mol % in terms of $H_3BO_3$.

By using an argon ion beam and a microscopic probe in combination, the compound 5 containing lithium and boron can be sampled physically from the section of the lithium ion secondary battery. The sampling is also possible by using a particular solvent that dissolves only the compound 5 containing lithium and boron. For example, after the compound 5 containing lithium and boron is etched using a neutral or weak acidic solvent, the compound 5 can be subjected to the analysis using ICP atomic emission spectrometry. Further, the analysis by the ICP atomic emission spectrometry can be performed after dissolving the positive electrode active material 4, the negative electrode active material 6, and the solid electrolyte 7 using strong acid such as a mixture of hydrochloric acid and hydrofluoric acid or a mixture of nitric acid and hydrofluoric acid.

The content of lithium and boron in the compound 5 containing lithium and boron can be obtained by analysis such as the STEM-EELS analysis in which the scanning transmission electron microscope and the electron energy loss spectrometry are combined or the ICP atomic emission spectrometry after the sample is dissolved in the solvent.

As described above, in the case of using $Li_{1+x2}Al_{x2}Ti_{2-x2}(PO_4)_3$ ($0 \leq x2 \leq 0.6$) for the solid electrolyte and vanadium lithium phosphate typified by $LiVOPO_4$ and $Li_3V_2(PO_4)_3$ for at least one of the positive electrode active material and the negative electrode active material, at least one constituent of titanium and aluminum may be distributed in the positive electrode layer 1 or the negative electrode layer 2. The interface resistance between the solid electrolyte layer 3 and the at least one layer of the positive electrode layer 1 and the negative electrode layer 2 structured as above is reduced further. As a result, the internal resistance of the lithium ion secondary battery is reduced. Moreover, titanium and/or aluminum (hereinafter referred to as "electrolyte constituent") may be distributed with gradient in the positive electrode layer 1 or the negative electrode layer 2. Moreover, the concentration of the electrolyte constituent on the side far from the solid electrolyte layer 3 (i.e., closer to the positive electrode current collector layer 21 and/or the negative electrode current collector layer 23) may be lower than the concentration of the electrolyte constituent on the side closer to the solid electrolyte layer 3 in the positive electrode layer 1 or the negative electrode layer 2. In this embodiment, moreover, the electrolyte constituent is distributed to the vicinity of the interface between the positive electrode layer 1 and the positive electrode current collector layer 21 and/or the interface between the negative electrode layer 2 and the negative electrode current collector layer 23, i.e., across the entire region of the positive electrode layer 1 or the negative electrode layer 2. This can reduce the interface resistance, and moreover reduce the internal resistance of the lithium ion secondary battery.

In the case where both titanium and aluminum are contained in the positive electrode layer 1 or the negative electrode layer 2, the distribution range of titanium and aluminum may be either the same or different. In particular, aluminum may be distributed more widely than titanium. Further, the distribution range may cover the positive electrode current collector layer 21 and/or the negative electrode current collector 23. The interface resistance between the solid electrolyte layer 3 and the at least one constituent of the positive electrode layer 1 and the negative electrode layer 2 structured as above can be reduced further. This provides the lithium ion secondary battery with reduced internal resistance and excellent reliability.

In this embodiment, by improving the adhesion between the solid electrolyte layer 3 and the at least one layer of the positive electrode layer 1 and the negative electrode layer 2, the interface resistance can be reduced further. Therefore, the positive electrode layer 1 and the negative electrode layer 2 with a thickness of 10 µm or less can be used. In particular, the positive electrode layer 1 and the negative electrode layer 2 with a thickness of 5 µm or less can be used.

Moreover, at least one constituent of titanium and aluminum in this embodiment may be distributed to cover the particle surface of the positive electrode active material 4 or the negative electrode active material 6 in the positive electrode layer 1 or the negative electrode layer 2.

The at least one constituent may exist even inside the particle of the positive electrode active material 4 or the negative electrode active material 6 and moreover may be distributed with the concentration gradient from the surface to the inside of the particle.

The materials included in the solid electrolyte layer 3, the positive electrode layer 1, and the negative electrode layer 2 in the lithium ion secondary battery 10 of this embodiment can be identified by the X-ray diffraction measurement. The distribution of titanium and aluminum can be analyzed by the EPMA-WDS element mapping, for example.

(Manufacturing Method for Lithium Ion Secondary Battery)

For manufacturing the lithium ion secondary battery 10 according to this embodiment, first, each material of the positive electrode current collector layer 21, the positive electrode layer 1, the solid electrolyte layer 3, the negative electrode layer 2, and the negative electrode current collector layer 23, which has been made into a paste, is prepared. Next, these materials are coated and dried, whereby green sheets are manufactured. The obtained green sheets are stacked to manufacture a stacked body, and by firing the stacked body at the same time, the lithium ion secondary battery 10 is manufactured.

A method of making the material into a paste is not limited in particular. For example, the paste can be obtained by mixing the powder of each material in vehicle. Here, the vehicle is a collective term for the medium in a liquid phase. The vehicle includes the solvent and the binder. By this method, the pastes for the positive electrode current collector layer 21, the positive electrode layer 1, the solid electrolyte layer 3, the negative electrode layer 2, and the negative electrode current collector layer 23 are prepared.

The prepared paste is coated on a base material such as PET (polyethylene terephthalate) in the desired order. Next, the paste on the base material is dried as necessary and then the base material is removed; thus, the green sheet is manufactured. The method of coating the paste is not particularly limited. Any of known methods including the screen printing, the coating, the transcription, and the doctor blade can be used.

A desired number of green sheets for the positive electrode current collector layer 21, the positive electrode layer 1, the solid electrolyte layer 3, the negative electrode layer 2, and the negative electrode current collector layer 23 can be stacked in the desired order. If necessary, alignment, cutting and the like can be performed to manufacture a stacked body. In the case of manufacturing a parallel type or serial-parallel type battery, the alignment may be conducted when the green sheets are stacked, so that the end face of the positive electrode layer 1 does not coincide with the end face of the negative electrode layer 2.

In order to manufacture the stacked body, the positive electrode layer unit and the negative electrode layer unit to be described below may be prepared and the stacking block may be manufactured.

First, the paste for the solid electrolyte layer 3 is formed into a sheet shape on a PET film by the doctor blade method. After the paste for the positive electrode layer 1 is printed on the obtained sheet for the solid electrolyte layer 3 by the screen printing, the printed paste is dried. Next, the paste for the positive electrode current collector layer 21 is printed thereon by the screen printing, and then the printed paste is dried. Furthermore, the paste for the positive electrode layer 1 is printed again thereon by the screen printing, and the printed paste is dried. Next, by separating the PET film, the positive electrode layer unit is obtained. In this manner, the positive electrode layer unit in which the paste for the positive electrode layer 1, the paste for the positive electrode current collector layer 21, and the paste for the positive electrode layer 1 are formed in this order on the sheet for the solid electrolyte layer 3 is obtained. In the similar procedure, the negative electrode layer unit is also manufactured. The negative electrode layer unit in which the paste for the negative electrode layer 2, the paste for the negative electrode current collector layer 23, and the paste for the negative electrode layer 2 are formed in this order on the sheet for the solid electrolyte layer 3 is obtained.

One positive electrode active material layer unit and one negative electrode active material layer unit are stacked so that the paste for the positive electrode layer 1, the paste for the positive electrode current collector layer 21, the paste for the positive electrode layer 1, the sheet for the solid electrolyte layer 3, the paste for the negative electrode layer 2, the paste for the negative electrode current collector layer 23, the paste for the negative electrode layer 2, and the sheet for the solid electrolyte layer 3 are disposed in this order. On this occasion, the units may be displaced so that the paste for the positive electrode current collector layer 21 of the first positive electrode layer unit extends to one end face only and the paste for the negative electrode current collector layer 23 of the second negative electrode layer unit extends to the other end face only. On both surfaces of the thusly stacked units, the sheet for the solid electrolyte layer 3 with predetermined thickness is stacked, thereby forming the stacking block.

The manufactured stacking block is crimped at the same time. The crimping is performed while heat is applied. The heating temperature is, for example, 40° C. to 95° C.

The crimped stacking block is fired by being heated at 600° C. to 1000° C. under the nitrogen atmosphere. The firing time is, for example, 0.1 to 3 hours. Through this firing, the stacked body is completed.

EXAMPLES

Examples 1-1 to 1-20

An embodiment of the present disclosure is hereinafter described with reference to examples. The embodiment of the present disclosure is, however, not limited to these examples. Note that "parts" refer to "parts by weight" unless otherwise stated.

(Preparation of Positive Electrode Active Material and Negative Electrode Active Material)

As the positive electrode active material and the negative electrode active material, $Li_2MnO_3$ prepared by the method below was used. First, $Li_2CO_3$ and $MnCO_3$ as the starting material were wet mixed for 16 hours using a ball mill with water as a solvent. The powder obtained after dehydration and drying was calcined for two hours at 800° C. in the air. The calcined product was roughly pulverized to be wet pulverized for 16 hours using a ball mill with water as a solvent and then dehydrated and dried, whereby the positive electrode active material powder and the negative electrode active material powder were obtained. The average particle diameter was 0.40 μm. It has been confirmed that the prepared powder had a constituent of $Li_2MnO_3$ according to the X-ray diffraction apparatus.

(Preparation of Paste for Positive Electrode Layer and Paste for Negative Electrode Layer)

The paste for the positive electrode layer and the paste for the negative electrode layer were prepared as below. As shown in Examples 1-1 to 1-20 in Table 1, 0.37 mol % to 1.69 mol % of $H_3BO_3$ powder, 2.19 mol % to 17.79 mol % of $Li_2CO_3$ powder, 15 parts of ethyl cellulose as binder, and 65 parts of dihydroterpineol as solvent were added to 100 parts of the positive electrode active material powder and the negative electrode active material powder and mixed, whereby the powder was dispersed in the solvent to provide the paste for the positive electrode layer and the paste for the negative electrode layer.

(Preparation of Paste for the Solid Electrolyte Layer)

As the solid electrolyte, $Li_{3.5}Si_{0.5}P_{0.5}O_4$ prepared by the method below was used. First, $Li_2CO_3$, $SiO_2$, and $Li_3PO_4$ as the starting material were wet mixed for 16 hours using a ball mill with water as a solvent. The powder obtained after dehydration and drying was calcined for two hours at 950° C. in the air. The calcined product was roughly pulverized to be wet pulverized for 16 hours using a ball mill with water as a solvent and then dehydrated and dried, whereby the solid electrolyte powder was obtained. The average particle diameter was 0.49 μm. It has been confirmed that the prepared powder had a constituent of $Li_{3.5}Si_{0.5}P_{0.5}O_4$ according to the X-ray diffraction apparatus.

Next, as shown in Examples 1-1 to 1-20 in Table 1, 0.37 mol % to 1.69 mol % of $H_3BO_3$ powder, 2.19 mol % to 17.79 mol % of $Li_2CO_3$ powder, and 100 parts of ethanol and 200 parts of toluene as solvent were added to 100 parts of this powder and wet mixed in the ball mill. After that, 16 parts of polyvinyl butyral binder and 4.8 parts of benzyl butyl phthalate were further added thereto and mixed, thereby preparing the paste for the solid electrolyte layer.

(Manufacture of Sheet for Solid Electrolyte Layer)

By molding a sheet with the paste for the solid electrolyte layer on a PET film as the base material by a doctor blade method, a sheet for a solid electrolyte layer with a thickness of 9 μm was obtained.

(Preparation of Paste for Positive Electrode Current Collector Layer and Paste for Negative Electrode Current Collector Layer)

Ag/Pd with a weight ratio of 70/30 and $Li_2MnO_3$ used as the positive electrode current collector and the negative electrode current collector were mixed at a volume ratio of 80/20. After that, as shown in Examples 1-1 to 1-20 in Table 1, 0.37 mol % to 1.69 mol % of $H_3BO_3$ powder, 2.19 mol % to 17.79 mol % of $Li_2CO_3$ powder, 10 parts of ethyl cellulose as binder and 50 parts of dihydroterpineol as solvent were added to $Li_2MnO_3$ and mixed, whereby the powder was dispersed in the solvent to provide the paste for the positive electrode current collector layer and the paste for the negative electrode current collector layer. As Ag/Pd with a weight ratio of 70/30, a mixture of Ag powder (average particle diameter of 0.3 μm) and Pd powder (average particle diameter of 1.0 μm) were used.

(Preparation of Terminal Electrode Paste)

By kneading silver powder, epoxy resin, and solvent with a three roll mill, the powder was dispersed in the solvent and a thermosetting terminal electrode paste was obtained.

With the use of these pastes, the lithium ion secondary battery was manufactured as below.

(Manufacture of Positive Electrode Layer Unit)

The paste for the positive electrode layer with a thickness of 5 μm was printed on the sheet for the above described solid electrolyte layer by the screen printing. The printed paste was dried for 10 minutes at 80° C. Next, the paste for the positive electrode current collector layer with a thickness of 5 μm was printed thereon by the screen printing. The printed paste was dried for 10 minutes at 80° C. The paste for the positive electrode layer with a thickness of 5 μm was printed again thereon by the screen printing. The printed paste was dried for 10 minutes at 80° C. Next, the PET film was separated. Thus, the sheet of the positive electrode layer unit was obtained in which the paste for the positive electrode layer, the paste for the positive electrode current collector layer, and the paste for the positive electrode layer were printed and dried in this order on the sheet for the solid electrolyte layer.

(Manufacture of Negative Electrode Layer Unit)

The paste for the negative electrode layer with a thickness of 5 μm was printed on the sheet for the above described solid electrolyte layer by the screen printing. The printed paste was dried for 10 minutes at 80° C. Next, the paste for the negative electrode current collector layer with a thickness of 5 μm was printed thereon by the screen printing. The printed paste was dried for 10 minutes at 80° C. The paste for the negative electrode layer with a thickness of 5 μm was printed again thereon by the screen printing. The printed paste was dried for 10 minutes at 80° C. Next, the PET film was separated. Thus, the sheet of the negative electrode layer unit was obtained in which the paste for the negative electrode layer, the paste for the negative electrode current collector layer, and the paste for the negative electrode layer were printed and dried in this order on the sheet for the solid electrolyte layer.

(Manufacture of Stacked Body)

The positive electrode layer unit and the negative electrode layer unit were stacked so that the paste for the positive electrode layer, the paste for the positive electrode current collector layer, the paste for the positive electrode layer, the sheet for the solid electrolyte layer, the paste for the negative electrode layer, the paste for the negative electrode current collector layer, the paste for the negative electrode layer, and the sheet for the solid electrolyte layer were disposed in this order. On this occasion, the units were displaced so that the paste for the positive electrode current collector layer of the positive electrode layer unit extends to one end face only and the paste for the negative electrode current collector layer of the negative electrode layer unit extends to the other end face only. The sheet for the solid electrolyte layer was stacked on both surfaces of the stacked units so that the thickness became 500 μm. After that, this was molded with a temperature of 80° C. and a pressure of 1000 kgf/cm² [98 Mpa], and cut, thereby forming a stacking block. After that, 100 pieces of the stacking blocks were arranged in the zirconia sagger to be fired at the same time to provide a stacked body. The firing was conducted in the air in a manner that the temperature was increased up to a firing temperature of 840° C. at a temperature rising rate of 200° C./hour and then the temperature was maintained for two hours. The stacked body after firing was cooled naturally. The appearance size of the battery after the blocks had been fired at the same time was 3.7 mm×3.2 mm×0.35 mm.

(Step of Forming Terminal Electrode)

The terminal electrode paste was coated to the end face of the stacked body. By thermally curing the paste on the end face for 30 minutes at 150° C., a pair of terminal electrodes was formed. Thus, the lithium ion secondary battery was obtained.

Comparative Examples 1-1 to 1-6

As shown in Comparative Examples 1-1 to 1-6 in Table 1, lithium ion secondary batteries were manufactured by the same method as that in Example 1-1 except that $H_3BO_3$ powder was not added and 0 mol % to 17.79 mol % of just the $Li_2CO_3$ powder was added in the preparation of the paste for the positive electrode layer and the paste for the negative electrode layer, the manufacture of the sheet for the solid electrolyte layer, and the preparation of the paste for the positive electrode current collector layer and the paste for the negative electrode current collector layer.

Comparative Examples 1-7 to 1-10

As shown in Comparative Examples 1-7 to 1-10 in Table 1, lithium ion secondary batteries were manufactured by the same method as that in Example 1-1 except that $Li_2CO_3$ powder was not added and 0.37 mol % to 1.69 mol % of just the $H_3BO_3$ powder was added in the preparation of the paste for the positive electrode layer and the paste for the negative electrode layer, the manufacture of the sheet for the solid electrolyte layer, and the preparation of the paste for the positive electrode current collector layer and the paste for the negative electrode current collector layer.

(Evaluation of Battery Characteristics)

Ten stacked bodies that have been fired at the same time were randomly selected. A lead wire was attached to the terminal electrode of each stacked body and then the repeated charging and discharging tests were conducted. The measurement condition was as below. The current was 2.0 μA at each of the charging and discharging. The cutoff voltage was 4.0 V at the charging and 0 V at the discharging. The discharge capacity and the internal resistance in the fifth cycle are shown in Table 1. Note that the content of lithium in terms of $Li_2CO_3$ and the content of boron in terms of $H_3BO_3$ according to Table 1 correspond to the content of lithium in terms of $Li_2CO_3$ and the content of boron in terms of $H_3BO_3$ to the total of the positive electrode active material included in the positive electrode layer, the negative electrode active material included in the negative electrode layer, and the solid electrolyte included in the solid electrolyte layer.

Here, the content of lithium and boron in the positive electrode active material, the negative electrode active material, the solid electrolyte, and the compound containing lithium and boron was obtained by the ICP atomic emission spectrometry. With the use of the argon ion beam and the microscopic probe, the positive electrode layer, the negative electrode layer, and the solid electrolyte layer were sampled from the lithium ion secondary battery. After that, the positive electrode active material, the negative electrode active material, and the solid electrolyte were dissolved in the mixture of nitric acid and hydrofluoric acid, and the solution was then subjected to the ICP atomic emission spectrometry. Moreover, the compound containing lithium and boron was dissolved in the weak acidic solvent, and then the solution was subjected to the ICP atomic emission spectrometry.

TABLE 1

| | Content of boron in $H_3BO_3$ [mol %] | Content of lithium in $Li_2CO_3$ [mol %] | Discharge capacity [μA] | Internal resistance [kΩ] |
|---|---|---|---|---|
| Example 1-1 | 0.37 | 2.19 | 4.2 | 120 |
| Example 1-2 | 0.37 | 4.38 | 10.3 | 70 |
| Example 1-3 | 0.37 | 8.89 | 12.2 | 60 |
| Example 2-4 | 0.37 | 13.34 | 9.1 | 80 |
| Example 1-5 | 0.37 | 17.79 | 4.2 | 120 |
| Example 1-6 | 0.74 | 2.19 | 4.5 | 120 |
| Example 1-7 | 0.74 | 4.38 | 9.2 | 70 |
| Example 1-8 | 0.74 | 8.89 | 11.2 | 70 |
| Example 1-9 | 0.74 | 13.34 | 10.1 | 70 |
| Example 1-10 | 0.74 | 17.79 | 4.1 | 100 |
| Example 1-11 | 1.11 | 2.19 | 4.4 | 120 |
| Example 1-12 | 1.11 | 4.38 | 11.1 | 100 |
| Example 1-13 | 1.11 | 8.89 | 12.1 | 90 |
| Example 1-14 | 1.11 | 13.34 | 11.1 | 100 |
| Example 1-15 | 1.11 | 17.79 | 5.1 | 100 |
| Example 1-16 | 1.69 | 2.19 | 4 | 120 |
| Example 1-17 | 1.69 | 4.38 | 4.1 | 100 |
| Example 1-18 | 1.69 | 8.89 | 5.1 | 90 |
| Example 1-19 | 1.69 | 13.34 | 4.1 | 100 |
| Example 1-20 | 1.69 | 17.79 | 4.3 | 100 |
| Comparative Example 1-1 | 0 | 0 | 0 | 2000 |
| Comparative Example 1-2 | 0 | 2.19 | 0 | 1300 |
| Comparative Example 1-3 | 0 | 4.38 | 0 | 1300 |
| Comparative Example 1-4 | 0 | 8.89 | 0 | 1300 |
| Comparative Example 1-5 | 0 | 13.34 | 0 | 1300 |
| Comparative Example 1-6 | 0 | 17.79 | 0 | 1300 |
| Comparative Example 1-7 | 0.37 | 0 | 2.2 | 200 |
| Comparative Example 1-8 | 0.74 | 0 | 2.3 | 200 |
| Comparative Example 1-9 | 1.11 | 0 | 2.2 | 200 |
| Comparative Example 1-10 | 1.69 | 0 | 2.1 | 200 |

As shown in Table 1, the content of lithium in terms of $Li_2CO_3$ and the content of boron in terms of $H_3BO_3$ obtained from the ICP atomic emission spectrometry were the same as the amount of $Li_2CO_3$ and $H_3BO_3$ added in the preparation of the paste for the positive electrode layer, the preparation of the paste for the negative electrode layer, the manufacture of the sheet for the solid electrolyte layer, the preparation of the paste for the positive electrode current collector layer, and the preparation of the paste for the negative electrode current collector layer.

Table 1 indicates that the discharge capacity is 4.0 μA or more and the internal resistance is 120 kΩ or less in any of Examples 1-1 to 1-20. It has been clarified that these lithium ion secondary batteries have much lower internal resistance and higher capacity than the lithium ion secondary battery according to Comparative Example 1 in which only lithium is contained and the lithium ion secondary battery according to Comparative Example 2 in which only boron is contained. Moreover, in the examples, it has been understood that the lithium ion secondary battery with much lower internal resistance and higher capacity can be obtained when the content of lithium and boron to the positive electrode active material included in the positive electrode layer, the negative electrode active material included in the negative electrode layer, and the solid electrolyte included in the solid electrolyte layer is respectively 4.38 mol % to 13.34 mol % in terms of $Li_2CO_3$ and 0.37 mol % to 1.11 mol % in terms of $H_3BO_3$.

Example 2-1

A lithium ion secondary battery was manufactured by the same method as that in Example 1-1 except that $Li_3V_2(PO_4)_3$ was used as the positive electrode active material and the negative electrode active material, that Cu was used as the positive electrode current collector and the negative electrode current collector, and that the firing was performed at the same time in nitrogen.

Example 2-2

A lithium ion secondary battery was manufactured by the same method as that in Example 1-2 except that $Li_3V_2(PO_4)_3$ was used as the positive electrode active material and the negative electrode active material, that Cu was used as the positive electrode current collector and the negative electrode current collector, and that the firing was performed at the same time in nitrogen.

Example 2-3

A lithium ion secondary battery was manufactured by the same method as that in Example 1-3 except that $Li_3V_2(PO_4)_3$ was used as the positive electrode active material and the negative electrode active material, that Cu was used as the positive electrode current collector and the negative electrode current collector, and that the firing was performed at the same time in nitrogen.

Example 2-4

A lithium ion secondary battery was manufactured by the same method as that in Example 1-4 except that $Li_3V_2(PO_4)_3$ was used as the positive electrode active material and the negative electrode active material, that Cu was used as the positive electrode current collector and the negative electrode current collector, and that the firing was performed at the same time in nitrogen.

Example 2-5

A lithium ion secondary battery was manufactured by the same method as that in Example 1-5 except that $Li_3V_2(PO_4)_3$ was used as the positive electrode active material and the negative electrode active material, that Cu was used as the positive electrode current collector and the negative electrode current collector, and that the firing was performed at the same time in nitrogen.

(Evaluation of Battery Characteristics)

Any ten stacked bodies that have been fired at the same time were selected. A lead wire was attached to the terminal electrode of each stacked body and then the repeated charging and discharging tests were conducted. The measurement condition was as below. The current was 2.0 µA at each of the charging and discharging. The cutoff voltage was 4.0 V at the charging and 0 V at the discharging. The discharge capacity and the internal resistance in the fifth cycle are shown in Table 2. Note that the content of lithium in terms of $Li_2CO_3$ and the content of boron in terms of $H_3BO_3$ according to Table 2 correspond to the content of lithium in terms of $Li_2CO_3$ and the content of boron in terms of $H_3BO_3$ to the total of the positive electrode active material included in the positive electrode layer, the negative electrode active material included in the negative electrode layer, and the solid electrolyte included in the solid electrolyte layer.

Here, the content of lithium and boron in the positive electrode active material, the negative electrode active material, the solid electrolyte, and the compound containing lithium and boron was obtained by the ICP atomic emission spectrometry. With the use of the argon ion beam and the microscopic probe, the positive electrode layer, the negative electrode layer, and the solid electrolyte layer were sampled from the lithium ion secondary battery. After that, the positive electrode active material, the negative electrode active material, and the solid electrolyte were dissolved in the mixture of nitric acid and hydrofluoric acid, and the solution was then subjected to the ICP atomic emission spectrometry. Moreover, the compound containing lithium and boron was dissolved in the weak acidic solvent, and then the solution was subjected to the ICP atomic emission spectrometry.

TABLE 2

| | Content of boron in $H_3BO_3$ [mol %] | Content of lithium in $Li_2CO_3$ [mol %] | Discharge capacity [µA] | Internal resistance [kΩ] |
|---|---|---|---|---|
| Example 2-1 | 0.37 | 2.19 | 3.1 | 140 |
| Example 2-2 | 0.37 | 4.38 | 9.8 | 80 |
| Example 2-3 | 0.37 | 8.89 | 11.1 | 70 |
| Example 2-4 | 0.37 | 13.34 | 8.8 | 90 |
| Example 2-5 | 0.37 | 17.79 | 3.5 | 130 |

As shown in Table 2, the content of lithium in terms of $Li_2CO_3$ and the content of boron in terms of $H_3BO_3$ obtained from the ICP atomic emission spectrometry were the same as the amount of $Li_2CO_3$ and $H_3BO_3$ added in the preparation of the paste for the positive electrode layer, the preparation of the paste for the negative electrode layer, the manufacture of the sheet for the solid electrolyte layer, the preparation of the paste for the positive electrode current collector layer, and the preparation of the paste for the negative electrode current collector layer.

Table 2 indicates that the lithium ion secondary battery with low internal resistance and high capacity can be obtained when boron is contained by 0.37 mol % in terms of $H_3BO_3$ and lithium is contained by 4.38 mol % to 13.34 mol % in terms of $Li_2CO_3$ even though $Li_3V_2(PO_4)_3$ was used as the positive electrode active material and the negative electrode active material.

Example 3-1

A lithium ion secondary battery was manufactured by the same method as that in Example 1-1 except that $LiCoO_2$ was used as the positive electrode active material and $Li_4Ti_5O_{12}$ was used as the negative electrode active material.

Example 3-2

A lithium ion secondary battery was manufactured by the same method as that in Example 1-2 except that $LiCoO_2$ was used as the positive electrode active material and $Li_4Ti_5O_{12}$ was used as the negative electrode active material.

Example 3-3

A lithium ion secondary battery was manufactured by the same method as that in Example 1-3 except that $LiCoO_2$ was used as the positive electrode active material and $Li_4Ti_5O_{12}$ was used as the negative electrode active material.

Example 3-4

A lithium ion secondary battery was manufactured by the same method as that in Example 1-4 except that $LiCoO_2$ was used as the positive electrode active material and $Li_4Ti_5O_{12}$ was used as the negative electrode active material.

Example 3-5

A lithium ion secondary battery was manufactured by the same method as that in Example 1-5 except that $LiCoO_2$ was used as the positive electrode active material and $Li_4Ti_5O_{12}$ was used as the negative electrode active material.

(Evaluation of Battery Characteristics)

Any ten stacked bodies that have been fired at the same time were selected. A lead wire was attached to the terminal electrode of each stacked body and then the repeated charging and discharging tests were conducted. The measurement condition was as below. The current was 2.0 µA at each of the charging and discharging. The cutoff voltage was 4.0 V at the charging and 0 V at the discharging. The discharge capacity and the internal resistance in the fifth cycle are shown in Table 3. Note that the content of lithium in terms of $Li_2CO_3$ and the content of boron in terms of $H_3BO_3$ according to Table 3 correspond to the content of lithium in terms of $Li_2CO_3$ and the content of boron in terms of $H_3BO_3$ to the total of the positive electrode active material included in the positive electrode layer, the negative electrode active material included in the negative electrode layer, and the solid electrolyte included in the solid electrolyte layer.

Here, the content of lithium and boron in the positive electrode active material, the negative electrode active material, the solid electrolyte, and the compound containing lithium and boron was obtained by the ICP atomic emission spectrometry. With the use of the argon ion beam and the microscopic probe, the positive electrode layer, the negative electrode layer, and the solid electrolyte layer were sampled from the lithium ion secondary battery. After that, the positive electrode active material, the negative electrode active material, and the solid electrolyte were dissolved in the mixture of nitric acid and hydrofluoric acid, and the solution was then subjected to the ICP atomic emission spectrometry. Moreover, the compound containing lithium and boron was dissolved in the weak acidic solvent, and then the solution was subjected to the ICP atomic emission spectrometry.

TABLE 3

|  | Content of boron in $H_3BO_3$ [mol %] | Content of lithium in $Li_2CO_3$ [mol %] | Discharge capacity [µA] | Internal resistance [kΩ] |
| --- | --- | --- | --- | --- |
| Example 3-1 | 0.37 | 2.19 | 2.3 | 170 |
| Example 3-2 | 0.37 | 4.38 | 9.2 | 90 |
| Example 3-3 | 0.37 | 8.89 | 10.7 | 70 |
| Example 2-4 | 0.37 | 13.34 | 8.2 | 90 |
| Example 3-5 | 0.37 | 17.79 | 2.5 | 150 |

As shown in Table 3, the content of lithium in terms of $Li_2CO_3$ and the content of boron in terms of $H_3BO_3$ obtained from the ICP atomic emission spectrometry were the same as the amount of $Li_2CO_3$ and $H_3BO_3$ added in the preparation of the paste for the positive electrode layer, the preparation of the paste for the negative electrode layer, the manufacture of the sheet for the solid electrolyte layer, the preparation of the paste for the positive electrode current collector layer, and the preparation of the paste for the negative electrode current collector layer.

Table 3 indicates that the lithium ion secondary battery with low internal resistance and high capacity can be obtained when boron is contained by 0.37 mol % in terms of $H_3BO_3$ and lithium is contained by 4.38 mol % to 13.34 mol % in terms of $Li_2CO_3$ even though $LiCoO_2$ was used as the positive electrode active material and $Li_4Ti_5O_{12}$ was used as the negative electrode active material.

The lithium ion secondary batteries according to Examples 1-1 to 1-20, 2-1 to 2-5, and 3-1 to 3-5 were subjected to the STEM-EELS analysis and the ICP atomic emission spectrometry. It has been confirmed from the results that the compound containing lithium and boron exists at the grain boundary of the positive electrode active material included in the positive electrode layer, the negative electrode active material included in the negative electrode layer, and the solid electrolyte included in the solid electrolyte layer. Moreover, it has been confirmed from the X-ray diffraction measurement results that the compound containing lithium and boron is amorphous.

Based on the above results, it is considered that when the added amount of $Li_2CO_3$ and $H_3BO_3$ is appropriate, the added compounds form the compound containing lithium and boron at the temperature increase. The compound is considered to function as the sintering aid at the interface between the solid electrolyte and the solid electrolyte, the interface between the positive electrode active material and the positive electrode active material, the interface between the positive electrode active material and the solid electrolyte, the interface between the negative electrode active material and the negative electrode active material, and the interface between the negative electrode active material and the solid electrolyte. After that, the formed compound is segregated at the grain boundary as the amorphous compound with the lithium ion conductivity. Therefore, it is considered that the internal resistance of the lithium ion secondary battery is reduced and the capacity thereof is improved.

The lithium ion secondary battery according to the embodiment of the present disclosure may be any of the following first to sixth lithium ion secondary batteries.

A first lithium ion secondary battery is an all-solid lithium ion secondary battery including a sintered body in which a positive electrode layer and a negative electrode layer are stacked alternately with a solid electrolyte layer interposed therebetween. A compound containing lithium and boron included in the positive electrode layer, the negative electrode layer, and the solid electrolyte layer contains lithium by 4.38 mol % to 13.34 mol % in terms of $Li_2CO_3$ and contains boron by 0.37 mol % to 1.11 mol % in terms of $H_3BO_3$ relative to a positive electrode active material included in the positive electrode layer, a negative electrode active material included in the negative electrode layer, and a solid electrolyte included in the solid electrolyte layer.

In a second lithium ion secondary battery according to the first lithium ion secondary battery, the compound containing lithium and boron exists at a grain boundary of the positive electrode active material included in the positive electrode layer, the negative electrode active material included in the negative electrode layer, and the solid electrolyte included in the solid electrolyte layer.

In a third lithium ion secondary battery according to the first or second lithium ion secondary battery, the compound containing lithium and boron is amorphous.

In a fourth lithium ion secondary battery according to any of the first to third lithium ion secondary batteries, the solid electrolyte included in the solid electrolyte layer is at least one selected from the group consisting of $Li_{3+x1}Si_{x1}P_{1-x1}O_4$ (0.4≤x1≤0.6), $Li_{1+x2}Al_{x2}Ti_{2-x2}(PO_4)_3$ (0≤x2≤0.6), germanium lithium phosphate ($LiGe_2(PO_4)_3$), $Li_2O$—$V_2O_5$—$SiO_2$, and $Li_2O$—$P_2O_5$—$B_2O_3$.

In a fifth lithium ion secondary battery according to any of the first to fourth lithium ion secondary batteries, the positive electrode active material or the negative electrode active material included in the positive electrode layer or the negative electrode layer is at least one selected from the group consisting of lithium manganese composite oxide $Li_2Mn_{x3}Ma_{1-x3}O_3$ (0.8≤x3≤1, Ma=Co, Ni), lithium cobaltate ($LiCoO_2$), lithium nickelate ($LiNiO_2$), lithium manganese spinel ($LiMn_2O_4$), composite metal oxides represented by general formula: $LiNi_{x4}Co_{y4}Mn_{z4}O_2$ (x4+y4+z4=1, 0≤x4≤1, 0≤y4≤1, 0≤z4≤1), a lithium vanadium compound ($LiV_2O_5$), olivine $LiMbPO_4$ (wherein Mb represents one or more elements selected from Co, Ni, Mn, Fe, Mg, Nb, Ti, Al, and Zr), vanadium lithium phosphate ($Li_3V_2(PO_4)_3$ or $LiVOPO_4$), Li-excess solid solution positive electrode $Li_2MnO_3$—$LiMcO_2$ (Mc=Mn, Co, Ni), lithium titanate ($Li_4Ti_5O_{12}$), and composite metal oxides represented by $Li_aNi_{x5}Co_{y5}Al_{z5}O_2$ (0.9<a<1.3, 0.9<x5+y5+z5<1.1).

In a sixth lithium ion secondary battery according to any of the first to fifth lithium ion secondary batteries, the solid electrolyte included in the solid electrolyte layer is lithium phosphosilicate ($Li_{3+x1}Si_{x1}P_{1-x1}O_4$ (0.4≤x1≤0.6)); and an active material included in the positive electrode layer and the negative electrode layer is $Li_2Mn_{x3}M_{1-x3}O_3$ (0.8≤x3≤1, M=Co, Ni).

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A lithium ion secondary battery comprising a sintered body including a solid electrolyte layer, and a positive electrode layer and a negative electrode layer which are stacked alternately with the solid electrolyte layer interposed therebetween, the lithium ion secondary battery being an all-solid type wherein:
   the positive electrode layer, the negative electrode layer, and the solid electrolyte layer include a composition containing a lithium compound and a boron compound, and
   a content of lithium and boron contained in the composition to a total of a positive electrode active material included in the positive electrode layer, a negative electrode active material included in the negative electrode layer, and a solid electrolyte included in the solid electrolyte layer is respectively in a range of 4.38 mol % to 13.34 mol % in terms of $Li_2CO_3$ and in a range of 0.37 mol % to 1.11 mol % in terms of $H_3BO_3$,
   wherein the composition exists at grain boundaries of the positive electrode active material, the negative electrode active material, and the solid electrolyte.

2. The lithium ion secondary battery according to claim 1, wherein the composition is amorphous.

3. The lithium ion secondary battery according to claim 1, wherein the solid electrolyte is at least one selected from a group consisting of $Li_{3+x1}Si_{x1}P_{1-x1}O_4$ (0.4≤x1≤0.6), $Li_{1+x2}Al_{x2}Ti_{2-x2}(PO_4)_3$ (0≤x2≤0.6), germanium lithium phosphate ($LiGe_2(PO_4)_3$), $Li_2O$—$V_2O_5$—$SiO_2$, and $Li_2O$—$P_2O_5$—$B_2O_3$.

4. The lithium ion secondary battery according to claim 1, wherein the positive electrode active material and the negative electrode active material are at least one selected from a group consisting of lithium manganese composite oxide $Li_2Mn_{x3}Ma_{1-x3}O_3$ (0.8≤x3≤1, Ma=Co, Ni), lithium cobaltate ($LiCoO_2$), lithium nickelate ($LiNiO_2$), lithium manganese spinel ($LiMn_2O_4$), composite metal oxides represented by general formula: $LiNi_{x4}Co_{y4}Mn_{z4}O_2$ (x4+y4+z4=1, 0≤x4≤1, 0≤y4≤1, 0≤z4≤1), a lithium vanadium compound ($LiV_2O_5$), olivine $LiMbPO_4$ (wherein Mb represents one or more elements selected from Co, Ni, Mn, Fe, Mg, Nb, Ti, Al, and Zr), vanadium lithium phosphate ($Li_3V_2(PO_4)_3$ or $LiVOPO_4$), Li-excess solid solution positive electrode $Li_2MnO_3$-$LiMcO_2$ (Mc=Mn, Co, Ni), lithium titanate ($Li_4Ti_5O_{12}$), and composite metal oxides represented by $Li_aNi_{x5}Co_{y5}Al_{z5}O_2$ (0.9<a<1.3, 0.9<x5+y5+z5<1.1).

5. The lithium ion secondary battery according to claim 1, wherein:
   the solid electrolyte is lithium phosphosilicate ($Li_{3+x1}Si_{x1}P_{1-x1}O_4$ (0.4≤x1≤0.6)); and
   the positive electrode active material and the negative electrode active material are $Li_2Mn_{x3}M_{1-x3}O_3$ (0.8≤x3≤1, M=Co, Ni).

* * * * *